E. T. HRUBESKY.
THILL COUPLING.
APPLICATION FILED MAR. 28, 1913.

1,095,113.  Patented Apr. 28, 1914.

Witnesses  Inventor

UNITED STATES PATENT OFFICE.

EDWARD THOMAS HRUBESKY, OF SCHUYLER, NEBRASKA.

THILL-COUPLING.

1,095,113.  Specification of Letters Patent.  Patented Apr. 28, 1914.

Application filed March 28, 1913. Serial No. 757,409.

*To all whom it may concern:*

Be it known that I, EDWARD THOMAS HRUBESKY, a citizen of the United States, residing at Schuyler, in the county of Colfax and State of Nebraska, have invented a new and useful Improvement in a Thill-Coupling Which is Adapted to be Used with the Ordinary Thill Now in General Use.

The primary object of this invention is to secure a thill coupling of the quick-shift anti-rattling type that is efficient, reliable and safe with a positive lock when attached.

It is very desirable to provide a thill coupling that is free from liability of accidental detachment. To secure this condition in this device a lock is formed by a hook held in place by a spiral spring which said hook engages the thill and prevents accidental displacement of the coupling.

In order to show more fully the practicability of this invention reference is made to the drawings of the thill coupling improvement herein of which drawings—

Figures 1, 2:
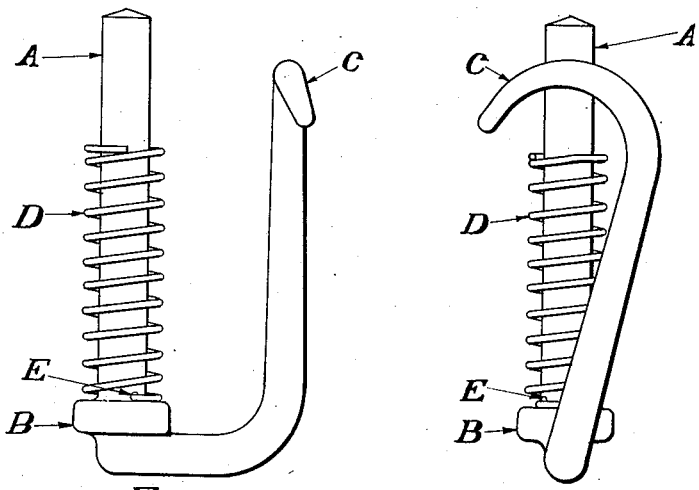
Figure 3:
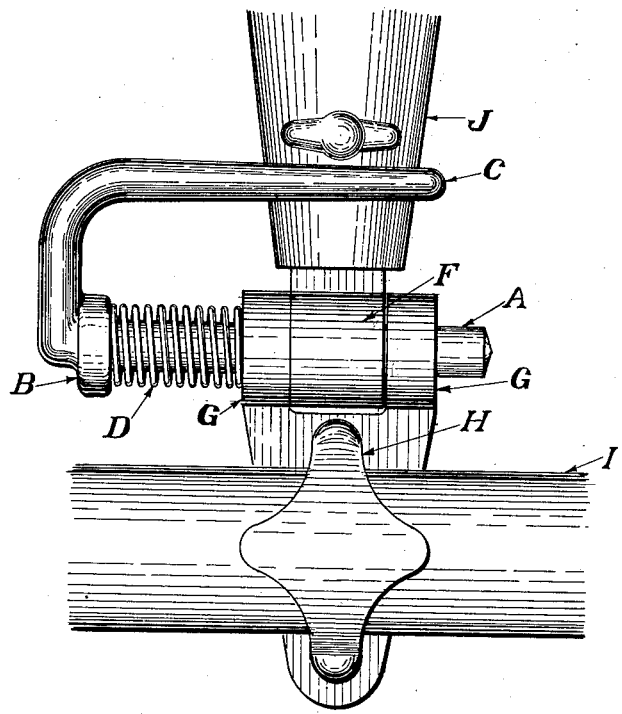

Figure 1 and Fig. 2 show the device in different positions, and Fig. 3 shows the thill coupling in one form of construction, but the use of the device is not confined to one form or design or to one method of attachment.

Similar reference characters indicate corresponding parts in all views.

Referring now to the drawings: Figs. 1 and 2 show a thill coupling comprising a practically U-shaped bolt —A, B— a shoulder on the bolt —A, C— a hook formed of one end of an arm of the bolt —A— extended, D— a spiral spring, with one end radially bent, for use on bolt —A—, which said spring abuts against the shoulder —B— when in use as shown in Fig. 3, and when not in use is held in place by having the end radially bent sprung into the hole —E— which hole is drilled in bolt —A— adjacent to the shoulder —B— as shown in Fig. 1.

The hook —C— which with the shoulder —B— the spring —D— and the thill —J— forms the lock which holds in place in eye —G—G—F— the connecting bolt substantially as shown.

In the attachment of this device the thill eye —F— is inserted between the lug eyes —G—G— thereby forming an eye into which is inserted the bolt —A— as shown in Fig. 3. In forcing the bolt —A— into the eye —G—G—F— the spring —D— is compressed to allow the hook —C— to pass the thill —J—, the bolt —A— is then twisted or rotated until the hook —C— engages the thill —J— thus holding the bolt —A— in position forming and locking the coupling substantially as shown.

The bolt —A— can be removed from the eye —G—G—F— only by a compression of the spring —D— with a twisting or rotating of the bolt —A— thus releasing the hook —C— from its engagement with the thill —J— allowing the removal of the bolt —A—.

When the device is in position as shown in Fig. 3 the action of the spring —D— is exerted in a pull on the thill —J— through the hook —C— thus holding the thill shank against one side of the eye-lugs —G—G— preventing noise and rattling.

Having thus described my invention, I claim:

1. In a thill coupling device, a U-shaped bolt having a shoulder thereon, a hook on the extended portion of said bolt, a hole drilled adjacent to said shoulder, a spring on said bolt, one end of said spring bent radially and adapted to enter said hole, said hook adapted to engage said vehicle thill or a clip, substantially as described.

2. In a thill coupling device, a U-shaped bolt having a shoulder thereon, a hook on the extended portion of said bolt, a hole drilled adjacent to said shoulder, a spring on said bolt, one end of said spring bent radially and adapted to enter said hole, said hook adapted to engage said vehicle thill or clip, said spring adapted to be compressed between said shoulder and said vehicle clip substantially as described.

EDWARD THOMAS HRUBESKY.

Witnesses:
 IRA W. FUNK,
 CHARLES C. WATTS.

Copies of this patent may be obtained for five cents each, by addressing the "Commissioner of Patents, Washington, D. C."